Aug. 14, 1928.
S. A. STAEGE
1,680,396
REGULATOR SYSTEM
Filed May 4, 1925
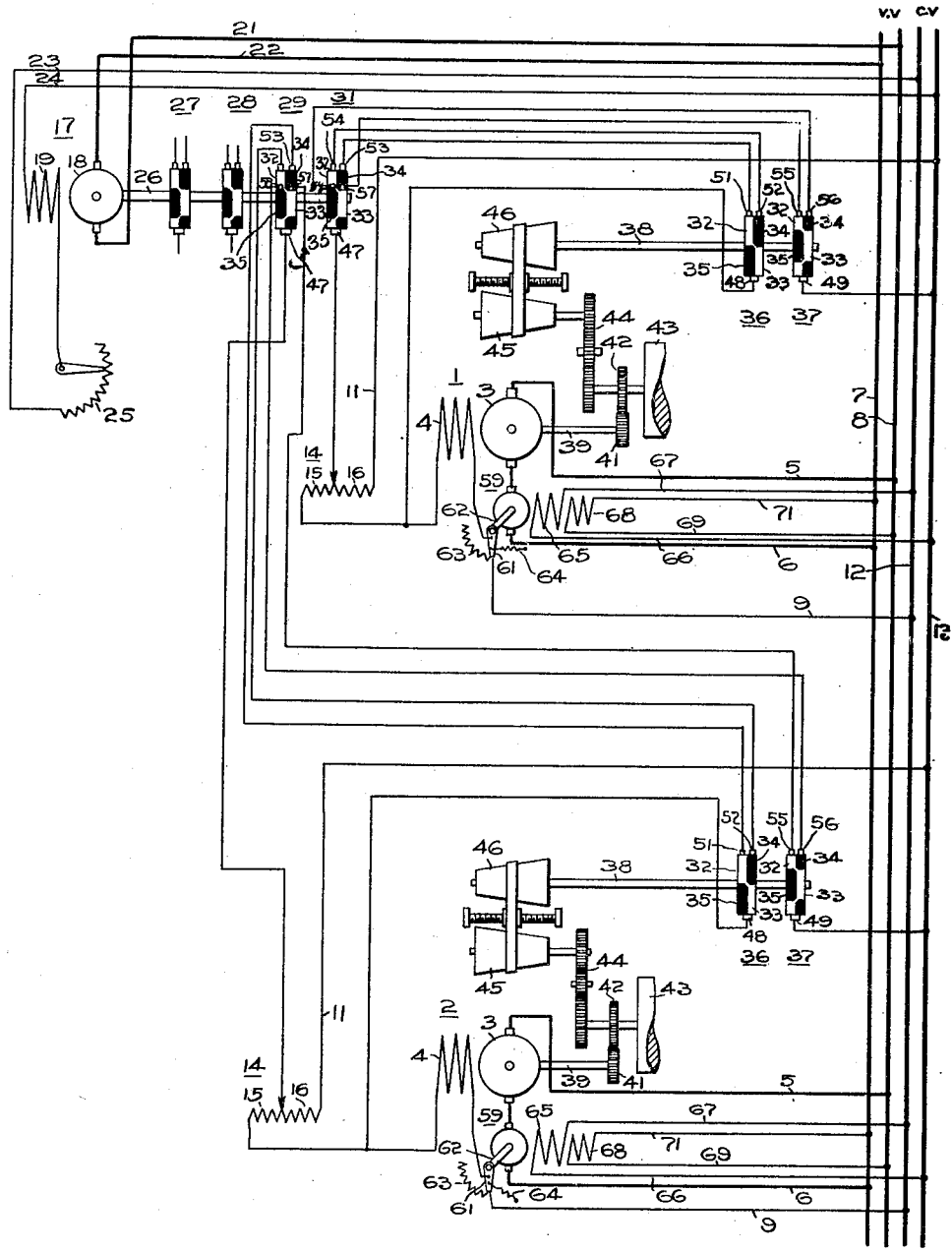
WITNESSES:
R. S. Harrison
J. E. Hardy
INVENTOR
Stephen A. Staege
BY
Wesley G. Carr
ATTORNEY Patented Aug. 14, 1928.

1,680,396

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed May 4, 1925. Serial No. 27,671.

My invention relates to regulator systems and more particularly to means for varying the excitation of a dynamo-electric machine in accordance with the load upon the machine.

One object of my invention is to provide means for so varying the excitation of a dynamo-electric machine as to minimize the amount of regulation necessary to maintain constant speed of the machine.

A further object of my invention is to provide means for imparting to a direct-current motor a substantially flat load-speed characteristic.

A still further object of my invention is to provide means, of the above-indicated character, in which the corrective effect upon the direct-current motor is varied in accordance with the voltage of the armature current supplied to the motor.

In certain applications of direct-current motors, such as their use for paper-machine drives, and in similar applications, load changes of considerable magnitude, sometimes suddenly applied and at other times gradually applied, take place. If the motor has a dropping load-speed characteristic, which is usually the case, it is necessary to insert considerable resistance in the shunt field-winding circuit in order to maintain the motor speed at the desired value, under such increased load. Where automatic speed regulation is employed, the regulator is required to bring about very great changes in field resistance and, whenever a regulator is not employed, a decided drop in the motor speed is caused by the increased load.

In my invention, I make use of a torque-motor-operated rheostat in the field circuit of the regulated motor, the torque motor being operated by the armature current of the controlled motor. The preferred arrangement is to have the armature of the torque motor connected in series-circuit relation with the armature of the main or controlled motor, so that the torque motor will be actuated proportionately to the armature current of the controlled motor.

The torque motor is connected to operate a face plate rheostat or other similar means of adjusting the field resistance of the controlled motor, so that an increase in the armature current of the controlled motor will cause a proportional increase in the torque of the motor controlling the rheostat, and consequently, a proportional variation of the main motor field resistance.

In the case of sectional paper-machine drives, where the Ward Leonard system of operation is employed, the generator voltage is adjusted to effect the required motor speed control, the motor having a definite speed for a definite impressed voltage thereon. It is well known that a direct-current motor so operated has a more pronounced load speed drooping characteristic when operated upon low voltage than when operated upon a higher voltage.

In order that the operation of the torque motor may compensate for variations in voltages impressed upon the driving motor, I employ a differential field winding on the torque motor that is energized in accordance with the voltage impressed upon the armature of the controlled motor. The torque motor is also provided with a field winding that is energized from a constant potential source of electrical energy.

In the accompanying drawings, the single figure illustrates my invention as applied to the driving motors of a paper-making machine that is provided with a speed regulator of the type disclosed in an application of William A. Menzies, Serial No. 530,708, filed Jan. 30, 1922, and assigned to the Westinghouse Electric & Manufacturing Company, although any one of many other types of speed regulators may be used with my invention.

Referring to the drawing, 1 and 2 indicate two section-driving motors that are similar in construction, each comprising an armature winding 3 and a field winding 4. The armature winding is connected, by means of leads 5 and 6, to variable-voltage conductors 7 and 8. The field winding 4 is connected by means of leads 9 and 11, to constant-voltage conductors 12 and 13. In series-circuit relation with the field winding 4 is provided a resistor 14 comprising sections 15 and 16.

A master motor 17 is provided as a speed-reference means for controlling the motors 1 and 2 and comprises an armature winding 18 and a field winding 19. The armature winding 18 is connected, by means of leads 21 and 22, to the variable-voltage conductors 7 and 8, and the field winding 18 is connected, by means of leads 23 and 24, to the constant-voltage conductors 12 and 13;

so that the armature winding and the field winding of the motor 17 are respectively in parallel-circuit relation to the armature windings and field windings of the section-driving motors 1 and 2. A manually operated rheostat 25 is also provided in the field circuit of the master motor 17 for adjusting the motor speed.

The motor 17 drives a shaft 26 upon which is mounted a suitable number of rotary contactors 27, 28, 29 and 31, which may be respectively connected to sets of two cooperating rotary contactors that are driven by the several section-driving motors. The rotary contactor 29 is illustrated as being connected to rotary contractors 36 and 37 that are driven in accordance with the speed of motor 2, and the rotary contactor 31 is illustrated as being connected to the rotary contactors 36 and 37 that are driven by the motor 1. It will be understood that the contactors 27 and 28 are adapted to be used with other section-driving motors (not illustrated).

Each rotary contactor is provided with staggered contact portions 32 and 33, which are electrically connected together, and with staggered non-conducting members 34 and 35. The rotary contactors 36 and 37 are mechanically connected by means of a shaft 38 that is driven in accordance with the speed of the corresponding section motor by means of a shaft 39, gear-wheels 41 and 42 that drive the paper rolls 43, gear-wheels 44 and cone pulleys 45 and 46, the latter being mounted on shaft 38.

The rotary contactors 31, 36 and 37 are provided with brushes 47, 48 and 49, respectively that are severally of sufficient width to engage both axially adjacent portions of the contactor throughout its entire rotation. The brush 47 is connected to the midpoint of the resistor 14 and the brushes 48 and 49 of the rotary contactors 36 and 37 are respectively connected to the terminals of the resistor sections 15 and 16. The contactor 36 is provided with a pair of alined narrow brushes 51 and 52 that are connected respectively to narrow brushes 53 and 54 of the rotary contactor 31; and the contactor 37 is provided with a pair of similar brushes 55 and 56 that are respectively connected to narrow brushes 57 and 58 of the contactor 31. The several brushes alternately engage a conducting and a non-conducting segment of their respective contactor surfaces.

The effective value of the resistor 14 depends upon the relative period of time during which sections 15 and 16 of the resistor are short-circuited through the rotary contactors to which they are connected.

It will be seen that the conducting segments of the rotary contactor 31 are continually connected to the midpoint of the resistor 14, and that the terminals of the resistor sections 15 and 16 are respectively connected to the conducting segments of rotary contactors 36 and 37. When the phase relation of the rotary contactor 36, with respect to the rotary contactor 31, is such that the brush 51 engages the contacting segment 32 of the contactor 36 at the same time that the brush 53 engages the conducting segment 33 of the rotary contactor 31, and the brush 52 of the contactor 36 engages the conducting segment 33 at the same time that the brush 54 engages the conducting segment 32 of the rotary contactor 31, the section 16 of the resistor 14 will be continually short-circuited either through brushes 53 and 51 or through brushes 52 and 54.

As the phase relation between the rotary contactors 31 and 36 varies, the duration of these short-circuits will be decreased, giving a greater effective value to the resistor section 16 until a point is reached where the rotary contactors are 180° out of phase with the position just considered. In that case, the brush 53 of the contactor 31 will engage a conducting segment at the same time that the brush 51 of the contactor 36 is leaving a conducting segment, under which condition there will be no current flow through brushes 51 and 53 and brushes 52 and 54. That is to say, there will be no short-circuit of the resistor section 16 through the rotary contactors 31 and 36. Similarly to the operation of rotary contactors 31 and 36 to control the resistor section 16, the rotary contactors 31 and 37 co-operate to control the resistor section 15.

A torque motor 59 is provided to operate the arm 61 of a face-plate rheostat, by means of a shaft 62 thereby varying the effective value of a resistor element 63. A spring or other suitable means 64 is provided for returning the arm 61 to the "all out" position of the rheostat and for creating a torque that is proportional to the departure of the arm from its initial position. The torque motor 59 is provided with a main field winding 65 that is connected by means of leads 66 and 67 to the constant-voltage conductors 12 and 13 and is also provided with a differentially related field winding 68 that is connected, by means of the leads 69 and 71, to the variable-voltage conductors 7 and 8. The armature of the torque motor 59 is connected in series relation with the armature 3 of the section-driving motor 1 across the variable-voltage mains 7 and 8.

It will be noted that the effective value of the resistor 14 which controls the speed of its associated section motor is proportional to the phase angle between the rotary contactors 36 and 37, which are driven in accordance with the speed of the section motor, and the co-operating rotary contactor 27, 28, 29 or 31 that is driven by the master motor 17. That is to say, in order to produce a corrective effect upon the controlled section motor by varying the effective value of the resistor 14, it is necessary for the phase relation between the controlled motor and the master motor to vary. The section motor, therefore, has the characteristic of a synchronous motor in that, in order to maintain constant speed under increased load conditions, it is necessary for the motor to drop back in phase to vary the duration of the short-circuits through the rotary contactors.

The torque motor, being provided with suitable springs or weights to return the motor to its initial position when its armature current is reduced to normal will have a movement that is approximately proportional to the load on the motor to be controlled. If the movement of the torque motor and the resistance values of the rheostat are properly selected, the motor will have a flat load-speed characteristic at maximum voltage.

It is obvious, therefore, that, if the amount of angular movement of the torque-motor-operated rheostat were directly proportional to the armature current alone, the amount of resistance in the controlled-motor field circuit would not be varied to produce a flat speed characteristic at a lower voltage. In order to overcome this condition, the differential field winding 68 has been provided so that, with a lower voltage upon a section motor, there will be a decreased voltage upon the differential field winding 68 and, consequently, a greater total field flux upon the torque motor. Lowering the voltage upon the section motor armature therefore, results in increasing the field excitation of the torque motor and in giving a greater corrective effect, thereby compensating for a greater inherent droop in the speed characteristic of the section-driving motor at the lower voltage.

It will be seen, therefore, that the torque-motor-operated rheostat will compensate for variations in load upon the section motor to produce a substantially flat speed-load characteristic thereof for any voltage that may be applied to it. If a sudden load is applied to the section motor, the torque-motor rheostat will operate in a very small period of time, usually a fraction of a second, to cut in sufficient resistance to maintain the section motor at the required speed, the variation being responsive to the load change upon the motor without waiting for any change in the motor speed, the required correction being thus anticipated by the torque motor before the speed regulator has had time to operate. It is, therefore, necessary to have the automatic speed regulator vary the effective value of the section-driving motor field resistance only a very small amount in order to maintain a constant speed harmony between the section motors, and this small amount of correction will be made with slight phase variation between the controlled motors and the master speed reference motor. The entire corrective effect is, therefore, much faster when the torque-motor rheostat is in use, as it is not necessary for a change in phase relation to occur between the controlled motor and the master motor before the field excitation of the controlled motor is varied sufficiently to enable it to carry the changed load.

Many modifications of my invention may be made within the spirit and scope thereof, and I do not desire to be limited, other than by the scope of the appended claims.

I claim as my invention:

1. In a regulator system, a dynamo-electric machine, means responsive to speed variations of said machine for varying the excitation thereof, and a torque motor responsive to the load upon said machine for varying the excitation thereof, said torque motor having a field winding responsive to the voltage of said machine.

2. In a regulator system, a dynamo-electric machine, means responsive to the speed variations of said machine for varying the excitation thereof, a torque motor connected in series-circuit relation with said machine and provided with a field winding energized in accordance with the voltage of said machine, and means operated by said torque motor for varying the excitation of said dynamo-electric machine.

3. In a regulator system, a dynamo-electric machine, and a torque motor connected in series-circuit relation with said machine and provided with differentially related field windings one of which is energized in accordance with the voltage of said machine.

4. In a speed regulator system, an electric motor, and an electro-responsive means for varying the excitation of said motor to give a substantially flat speed-load characteristic, said electro-responsive means comprising a winding energized in accordance with the load current of said motor and a winding energized in accordance with the voltage of said motor.

5. In a regulator system, an electric motor, means responsive to the speed variations of said motor for varying the excitation thereof, electroresponsive means for varying the excitation of said motor, said electro-responsive means having a winding energized in accordance with the load current of said motor and a winding energized in accordance with the voltage impressed on said motor.

6. In a regulator system, an electric motor, means responsive to the speed variations of said motor for varying the excitation thereof, a torque motor connected in series-circuit relation with said motor and provided with differentially related field windings, one of said field windings being connected to be energized in accordance with the voltage of said motor and one of said field windings being connected to be energized from a constant-voltage source, and means operated by said torque motor for varying the excitation of said motor.

In testimony whereof, I have hereunto subscribed my name this 29th day of April, 1925.

STEPHEN A. STAEGE.